US010789494B2

(12) United States Patent
Miyamoto

(10) Patent No.: US 10,789,494 B2
(45) Date of Patent: Sep. 29, 2020

(54) PASSENGER COUNTING DEVICE, SYSTEM, METHOD AND PROGRAM

(71) Applicant: NEC CORPORATION, Minato-ku (JP)

(72) Inventor: Shinichi Miyamoto, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/296,638

(22) Filed: Mar. 8, 2019

(65) Prior Publication Data

US 2019/0205678 A1   Jul. 4, 2019

Related U.S. Application Data

(63) Continuation of application No. 15/572,995, filed as application No. PCT/JP2016/001557 on Mar. 17, 2016, now Pat. No. 10,318,830.

(51) Int. Cl.
*G06K 9/00* (2006.01)
*G06K 9/20* (2006.01)
(Continued)

(52) U.S. Cl.
CPC ..... *G06K 9/00838* (2013.01); *G06K 9/00255* (2013.01); *G06K 9/00261* (2013.01);
(Continued)

(58) Field of Classification Search
CPC .. G06K 9/00838; G06K 9/2018; G06K 9/209; G06K 9/624; G06K 9/00255;
(Continued)

(56) References Cited

U.S. PATENT DOCUMENTS 8,824,742 B2   9/2014  Skaff et al.
10,318,830 B2  6/2019  Miyamoto
(Continued)

FOREIGN PATENT DOCUMENTS

JP   2003-16425 A     1/2003
JP   2011002718 A  *  1/2011
(Continued)

OTHER PUBLICATIONS

Hao et al. "A Near-Infrared Imaging Method for Capturing the Interior of a Vehicle Through Windshield." IEEE Southwest Symposium on Image Analysis & Interpretation, May 23, 2010, pp. 109-112 (Year: 2020).*

(Continued)

*Primary Examiner* — Jon Chang
(74) *Attorney, Agent, or Firm* — Sughrue Mion, PLLC

(57) ABSTRACT

The image processing system acquires a first image by causing a first photographing device to photograph a vehicle illuminated by a first light source and a second light source, wherein the second source illuminates the vehicle from a direction different from that of the first light source. The system acquires a second image by causing a second photographing device to photograph a photographing range same as that of the first photographing device through a first filter. The system acquires a third image by causing a third photographing device to photograph a photographing range same as that of the first photographing device through a second filter type of which is different from that of the first filter. The system generates a fourth image by processing on the first image, the second image and the third image.

18 Claims, 8 Drawing Sheets

(51) Int. Cl.
G06K 9/62 (2006.01)
G06T 1/00 (2006.01)
G06T 7/60 (2017.01)

(52) U.S. Cl.
CPC .......... G06K 9/209 (2013.01); G06K 9/2018 (2013.01); G06K 9/624 (2013.01); G06T 1/00 (2013.01); G06T 7/60 (2013.01); *G06K 9/00832* (2013.01); *G06T 2207/30242* (2013.01)

(58) Field of Classification Search
CPC .. G06K 9/00261; G06K 9/00832; G06T 1/00; G06T 7/60; G06T 2207/30242
See application file for complete search history.

(56) References Cited

U.S. PATENT DOCUMENTS

| | | | |
|---|---|---|---|
| 2006/0102843 | A1 | 5/2006 | Bazakos et al. |
| 2008/0252882 | A1* | 10/2008 | Kesterson ............... G02B 5/208 356/300 |
| 2009/0225156 | A1 | 9/2009 | Akiyama et al. |
| 2011/0200237 | A1* | 8/2011 | Nakamura ........... A61B 5/1171 382/127 |
| 2013/0141574 | A1 | 6/2013 | Dalal et al. |
| 2013/0147959 | A1 | 6/2013 | Wang et al. |
| 2013/0336538 | A1* | 12/2013 | Skaff .................. G06K 9/00785 382/104 |
| 2015/0054639 | A1 | 2/2015 | Rosen |
| 2015/0278617 | A1 | 10/2015 | Oami |
| 2015/0294144 | A1 | 10/2015 | Konishi |
| 2016/0239714 | A1 | 8/2016 | Oami et al. |
| 2017/0372143 | A1 | 12/2017 | Barcus et al. |

FOREIGN PATENT DOCUMENTS

| | | |
|---|---|---|
| JP | 2013-236962 A | 11/2013 |
| WO | 2008/099146 A1 | 8/2008 |
| WO | 2014/061195 A1 | 4/2014 |
| WO | 2014/064898 A1 | 5/2014 |
| WO | 2015/052896 A1 | 4/2015 |

OTHER PUBLICATIONS

English Translation of JP 2011002718 A (Year: 2011).*
Faird, H. et al., "Separating reflections from images by use of independent component analysis", Journal of the Optical Society of America A., vol. 16, No. 9, 1999, pp. 2136-2145.
International Search Report for PCT/JP2016/001557 dated May 17, 2016 [PCT/ISA/210].
Communication dated Jan. 22, 2019 from the European Patent Office in application No. 16894272.0.
Pavlidis et al., "A Vehicle Occupant Counting System Based on Near-infrared Phenomenology and Fuzzy Neural Classification." IEEE Transactions on Intelligent Transportation Systems, vol. 1, No. 2, Jun. 2000, pp. 72-85 (Year: 2000).
Tryer. "An Automated System for Determining the Number of Occupants within Moving Road Vehicles." 6th IET Conference on Road Pricing, Dec. 9, 2008, 28 pages (Year: 2008).
Yuan et al., "A Vehicle Occupant Counting System Using Near-infrared (NIR) Image." IEEE 11th International Conference on Signal Processing, Oct. 21, 2012, pp. 716-719 (Year: 2012).
Non-Final communication dated Feb. 7, 2020 from the United States Patent and Trademark Office in U.S. Appl. No. 16/296,514.
Non-Final communication dated Feb. 24, 2020 from the United States Patent and Trademark Office in U.S. Appl. No. 16/296,774.

* cited by examiner

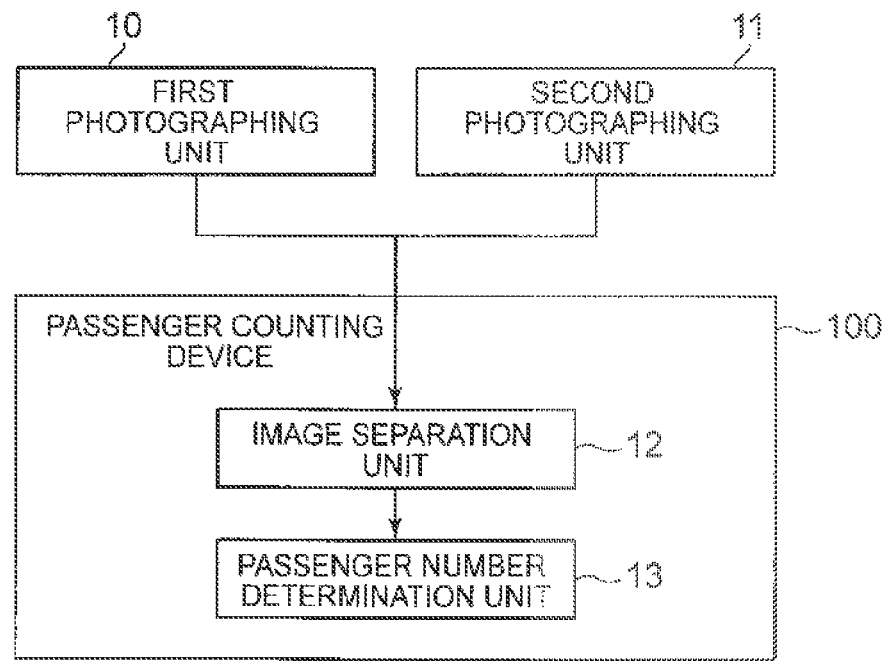
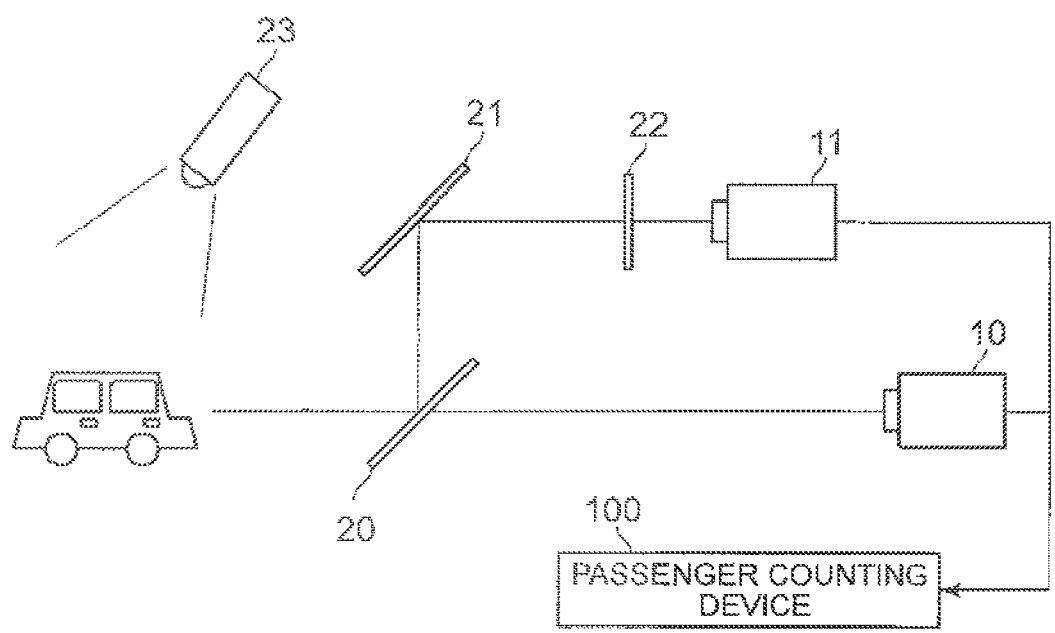

PASSENGER COUNTING DEVICE, SYSTEM, METHOD AND PROGRAM

CROSS REFERENCE TO RELATED APPLICATIONS

This application is a Continuation of U.S. application Ser. No. 15/572,995, filed Nov. 9, 2017, now U.S. Pat. No. 10,318,830, which is a National Stage of International Application No. PCT/JP2016/001557 filed Mar. 17, 2016, the disclosures of which are incorporated herein in their entirety by reference

TECHNICAL FIELD

The present invention relates to passenger counting device, system, method, and program to count the number of passengers of a vehicle.

BACKGROUND ART

In recent years, a high occupancy vehicle (HOV) system, which discounts tolls depending on the number of passengers of a vehicle or permits passage of a road only to a vehicle with the passenger number exceeding a predetermined number, has been used. In the HOV system, a technique is used in which the passenger number is counted by photographing a vehicle using a camera and performing face detection on the photographed image.

PTLs 1 to 3 disclose a system for counting the number of passengers of a vehicle by face detection. PTL 1 discloses a technique of counting the number of passengers of a vehicle by detecting a profile of a person. PTL 2 discloses a technique of measuring the passenger number by detecting persons and estimating at which positions in a vehicle the persons are on board. PTL 3 discloses a technique of counting the passenger number using a movement amount of a vehicle and a person detection result.

CITATION LIST

Patent Literature

PTL 1: International Publication No. 2014/061195
PTL 2: International Publication No. 2014/064898
PTL 3: International Publication No. 2015/052896

SUMMARY OF INVENTION

Technical Problem

There is a case where a person or an object outside a vehicle is reflected on a window of the vehicle in an image obtained by photographing the vehicle. In such a case, there is a possibility of erroneous detection at the time of performing face detection for a person inside the vehicle due to the reflection of the window of the vehicle in the acquired image.

Accordingly, an object of the present invention is to provide passenger counting device, system, method and program capable of accurately counting the number of passengers of a vehicle.

Solution to Problem

A passenger counting device according to the present invention is characterized by including: an image separation means for acquiring a plurality of separate images based on a first image acquired by photographing a vehicle and a second image acquired by photographing the vehicle in a state of receiving only light of a first specific wavelength band; and a passenger number determination means for determining the number of passengers of the vehicle based on the plurality of separate images.

A passenger counting system according to the present invention is characterized by including: a first photographing means for photographing a vehicle and acquiring a first image; a second photographing means for photographing the vehicle in a state of receiving only light of a first specific wavelength band and acquiring a second image; an image separation means for acquiring a plurality of separate images based on the first image and the second image; and a passenger number determination means for determining the number of passengers of the vehicle based on the plurality of separate images.

A passenger counting method according to the present invention is characterized by acquiring a plurality of separate images based on a first image acquired by photographing a vehicle and a second image acquired by photographing the vehicle in a state of receiving only light of a first specific wavelength band and determining the number of passengers of the vehicle based on the plurality of separate images.

A passenger counting program according to the present invention is characterized by causing a computer to execute: an image separation process of acquiring a plurality of separate images based on a first image acquired by photographing a vehicle and a second image acquired by photographing the vehicle in a state of receiving only light of a first specific wavelength band; and a passenger number determination process of determining the number of passengers of the vehicle based on the plurality of separate images.

Advantageous Effects of Invention

According to the present invention, it is possible to accurately count the number of passengers of the vehicle.

BRIEF DESCRIPTION OF DRAWINGS

FIG. 1 It depicts a block diagram illustrating a configuration of a first exemplary embodiment of a passenger counting system according to the present invention.

FIG. 2 It depicts a block diagram illustrating a hardware configuration of the first exemplary embodiment of the passenger counting system according to the present invention.

DESCRIPTION OF EMBODIMENTS

First Exemplary Embodiment

Figure 3:
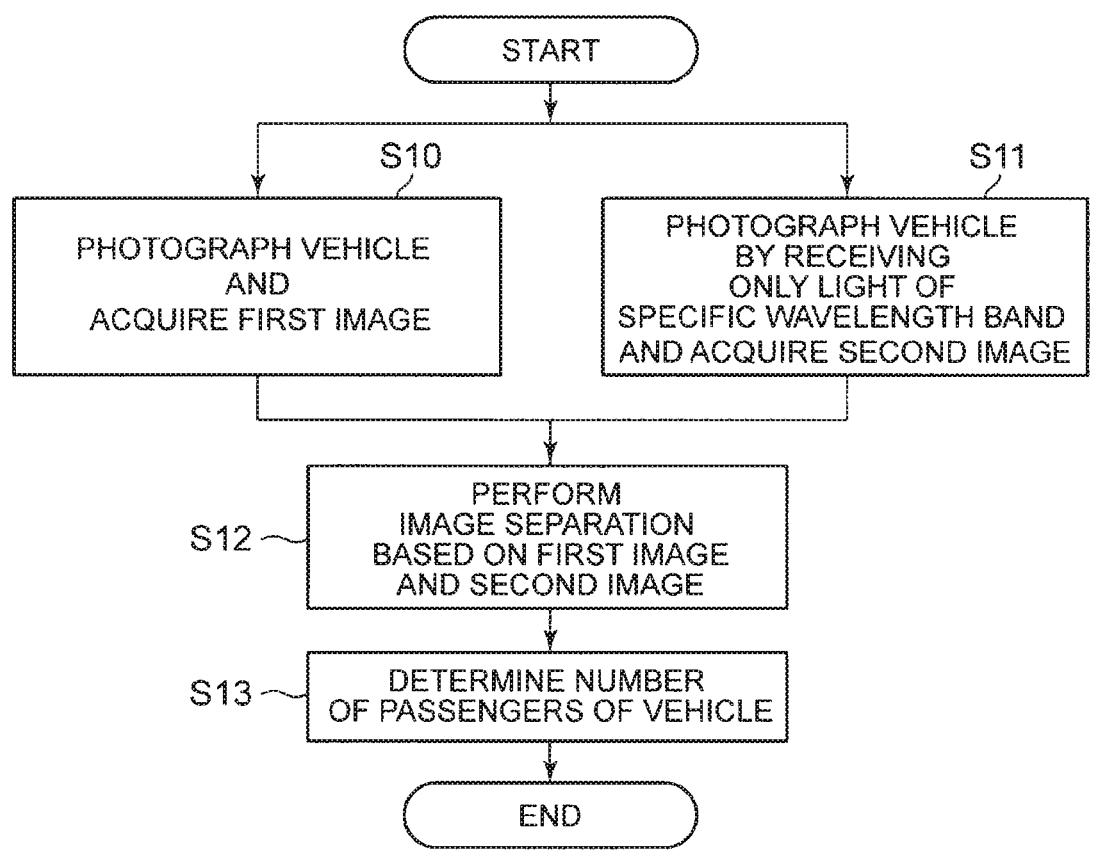
FIG. 3 It depicts a flowchart illustrating an operation of the first exemplary embodiment of the passenger counting system according to the present invention.

A configuration of a passenger counting system according to the present exemplary embodiment will be described with reference to FIGS. 1 and 2. FIG. 1 is a block diagram illustrating the configuration of the passenger counting system according to the present exemplary embodiment. The passenger counting system includes a first photographing unit 10, a second photographing unit 11, and a passenger number counting device 100. In addition, the passenger counting device 100 includes an image separation unit 12 and a passenger number determination unit 13.

The first photographing unit 10 photographs a vehicle and acquires a first image. The first photographing unit 10 is a general camera, and photographs the vehicle as a subject to generate a digital image.

The second photographing unit 11 photographs the vehicle in a state of receiving only a first specific wavelength band and acquires a second image. The second photographing unit 11 is a general camera similar to the first photographing unit 10, and photographs the vehicle as the subject to generate a digital image. The second photographing unit 11 has sensitivity of light of at least the first specific wavelength band.

The image separation unit 12 performs image separation based on the first image acquired by the first photographing unit 10 and the second image acquired by the second photographing unit 11, thereby acquiring a plurality of separate images including a separate image in which reflection on a glass window is reduced. Specifically, the image separation unit 12 separates image data into two images having different distances from the first photographing unit 10 and the second photographing unit 11 using independent component analysis.

The passenger number determination unit 13 determines the number of passengers of the vehicle based on the plurality of separate images output by the image separation unit 12. Specifically, the passenger number determination unit 13 acquires the plurality of separate images output by the image separation unit 12, performs face detection on the separate image in which the reflection is reduced, and determines the number of parts, which have been determined as a face of a person, as the number of passengers of the vehicle.

FIG. 2 is an explanatory diagram illustrating a hardware configuration of the passenger counting system according to the present exemplary embodiment. The first photographing unit 10 and the second photographing unit 11 are installed at positions, such as a road side, where the vehicle can be photographed. A half mirror 20 is installed in front of the first photographing unit 10 (between the first photographing unit 10 and the vehicle). A reflection mirror 21 is installed in front of the second photographing unit 11 (a position receiving reflected light from the half mirror 20). In addition, a band-pass filter 22 is installed between the second photographing unit 11 and the reflection mirror 21. The band-pass filter 22 is a filter that can pass only light of a first specific wavelength band $\lambda_1$.

A part of light incident from a direction of the vehicle passes through the half mirror 20 and is incident on the first photographing unit 10. In addition, the remaining part of the light incident from the direction of the vehicle is reflected by the half mirror 20 and is incident on the reflection mirror 21. The light incident on the reflection mirror 21 is reflected and passes through the band-pass filter 22, and only the light of the first specific wavelength body $\lambda_1$ is incident on the second photographing unit 11.

In the configuration illustrated in FIG. 2, the respective devices are installed such that an optical path length from the first photographing unit 10 to the vehicle and an optical path length from the second photographing unit 11 to the vehicle are the same. In addition, the first photographing unit 10 and the second photographing unit 11 perform photographing such that a photographing range of the first photographing unit 10 and a photographing range of the second photographing unit 11 are the same.

In addition, a lamp 23 that emits the light of the first specific wavelength band $\lambda_1$ is installed at a position where a passing vehicle can be irradiated to irradiate the entire vehicle. As the light passes through the band-pass filter 22, the light quantity decreases as compared with the light quantity before passing. However, the second photographing unit 11 can obtain the sufficient light quantity as the lamp 23 irradiates the vehicle with the light of the first specific wavelength band $\lambda_1$, and thus, it is possible to acquire a clear vehicle image.

With the above-described configuration, the first photographing unit 10 can photograph a normal vehicle image in a state where a wavelength of incident light is not limited. The second photographing unit 11 can photograph a vehicle image in a state where only the light of the first specific wavelength band $\lambda 1$ is incident.

Next, an operation of the passenger counting system according to the present exemplary embodiment will be described. FIG. 3 is a flowchart illustrating the operation of the passenger counting system according to the present exemplary embodiment.

The first photographing unit 10 photographs the vehicle and acquires the image (step S10). The first photographing unit 10 is installed on the road side, for example, and photographs the vehicle from a lateral direction (a direction perpendicular to a traveling direction of the vehicle).

The second photographing unit 11 photographs the vehicle in the state of receiving only the light of the first specific wavelength band and acquires the image (step S11). The second photographing unit 11 is installed on the road side, for example, and photographs the vehicle from the lateral direction (the direction perpendicular to the traveling direction of the vehicle), which is similar to the first photographing unit 10. Since the band-pass filter 22 is installed in front of the second photographing unit 11, the second photographing unit 11 photographs the vehicle in the state where only the light of the first specific wavelength body $\lambda_1$ is incident.

However, the installation positions of the first photographing unit 10 and the second photographing unit 11 are not limited to the above-described positions, and may be set to positions that enable photographing from the front or diagonally front of the vehicle. For example, the first photographing unit 10 and the second photographing unit 11 are installed at a tollgate that utilizes an HOV system.

The first photographing unit 10 and the second photographing unit 11 photograph the vehicle at the same timing. For example, the passenger counting device 100 transmits an instruction signal to the first photographing unit 10 and the second photographing unit 11 in order to synchronize photographing timings. For example, a detection means such as an infrared sensor is installed in order to detect a timing of passing of the vehicle, and the passenger counting device 100 may transmit an indication signal to the first photographing unit 10 and the second photographing unit 11 at a timing of receiving a signal indicating that the vehicle has passed from the detection means. Alternatively, the first photographing unit 10 and the second photographing unit 11 may directly receive the signal indicating that the vehicle has passed from the detection unit, and perform photographing at the timing of receiving the signal.

The image separation unit 12 performs the image separation based on the first image obtained by photographing the vehicle through the first photographing unit 10 and the second image obtained by photographing the vehicle through the second photographing unit 11, and acquires the plurality of separate images including the separate image in which the reflection on the glass window is reduced (step S12). Specifically, the image separation unit 12 performs the independent component analysis on image data representing the first image and the second image, and separates an image representing the interior of the vehicle from an image representing the reflection on the glass window (a person, an object, or the like reflected on the glass window).

The image separation using the independent component analysis will be described in details. Image data representing the first image is denoted by $x_1$, and image data representing the second image is denoted by $x_2$. In addition, an actual image representing the interior of the vehicle is denoted by $s_1$, and an actual image representing the reflection on the glass window is denoted by $s_2$. Then, the acquired image is denoted by a vector $X=(x_1, x_2)^T$, and the actual image is denoted by a vector $S=(s_1, s_2)^T$. Since the image data $x_1$ and $x_2$ are obtained in the state of mixing of $s_1$ and $s_2$, the following Formula (1) is established when a mixing matrix is A.

$$X=AS \quad (1)$$

Since A is an unknown matrix, it is necessary to estimate S from X. The image separation unit 12 estimates $y_1$ and $y_2$ by calculating a matrix W such that $y_1$ and $y_2$ of the vector $Y=(y_1, y_2)$ are independent in the following Formula (2).

$$Y=WX \quad (2)$$

As described above, one of $y_1$ and $y_2$, obtained by the processing as described above, is an approximate value of $s_1$ representing the interior of the vehicle, and the other is an approximate value of $s_2$ representing the reflection on the glass window. The image separation unit 12 outputs the image data which is the approximate value of $s_1$ representing the interior of the vehicle between $y_1$ and $y_2$ representing the image data as the separate image in which the reflection is reduced. For example, the image separation unit 12 analyzes the images of $y_1$ and $y_2$ and determines whether or not the image is an image inside the vehicle depending on presence or absence of a face of a person or in-vehicle equipment. Alternatively, the image separation unit 12 may output the images represented by $y_1$ and $y_2$ to an external display device to allow a user to select which image is the image inside the vehicle, and output the selected image as the separate image in which the reflection is reduced. In addition, the image separation unit 12 may determine which image is the image in which the reflection is reduced using a specific method, and output the determined image as the separate image in which the reflection is reduced. Specifically, the image separation unit 12 applies an algorithm to detect a face to the images represented by $y_1$ and $y_2$, and acquires the number of faces. Thereafter, the image separation unit 12 may select and output an image having the larger number of faces as the separate image in which the reflection is reduced. Here, there is no particular need to be limited to the number of faces, any part may be used as long as it is a detectable part of a person, and a nose, an eye, an arm, a neck, or the like can be also used as a detection target. Incidentally, the passenger counting device 100 may include a selection means for selecting an image in which reflection is reduced from among the plurality of separate images, and an acquisition means for acquiring the number of specific parts of a person for the plurality of separate images, in addition to the image separation unit 12.

Figure 4:
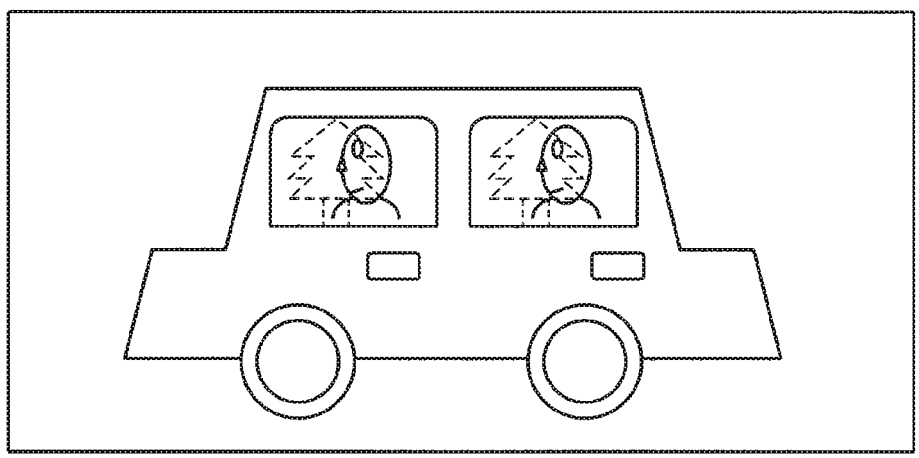
FIG. 4 It depicts an explanatory view illustrating a first image acquired by a first photographing unit.
Figure 5:
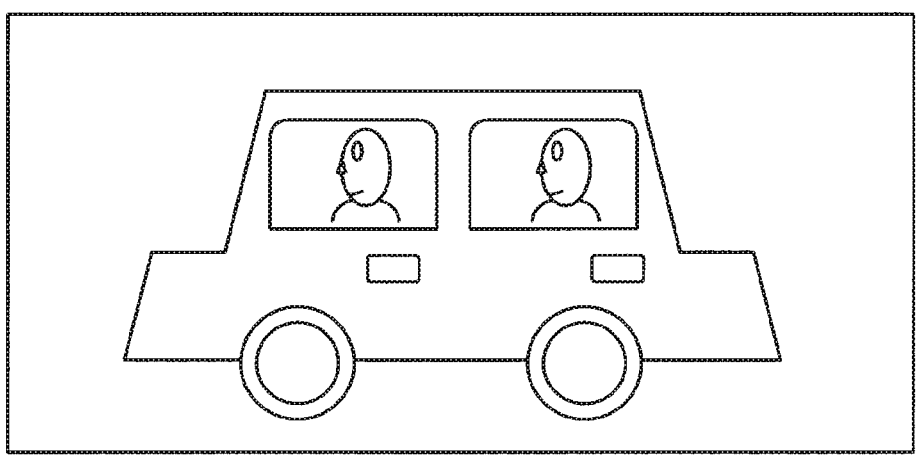
FIG. 5 It depicts an explanatory view illustrating a separate image according to the first exemplary embodiment.

FIG. 4 is an explanatory view illustrating the first image acquired by the first photographing unit 10. FIG. 5 is an explanatory view illustrating the separate image in the present exemplary embodiment. In the image illustrated in FIG. 4, a tree outside the vehicle is reflected on the glass window of the vehicle and is displayed to be superimposed on the face of the person inside the vehicle. In the separate image illustrated in FIG. 5, the reflection on the glass window is reduced, and the face of the person inside the vehicle is clearly displayed. Although not illustrated, the reflection on the glass window is displayed in the other image obtained by separation. That is, image data is separated into two images having different distances from the first photographing unit 10 and the second photographing unit 11 based on the first image and the second image.

The passenger number determination unit 13 determines the number of passengers of the vehicle based on the plurality of separate images output by the image separation unit 12 (step S13). Specifically, the passenger number determination unit 13 acquires the plurality of separate images output by the image separation unit 12, performs face detection on the separate image in which the reflection is reduced, and determines the number of parts, which have been determined as the face of the person, as the number of passengers of the vehicle.

When the face of the passenger is reflected at an angle close to a profile, the passenger number determination unit 13 detects the person using a profile detector. Alternatively, when the face of the passenger is reflected at an angle close to a front face, the passenger number determination unit 13 detects the person using a front face detector. These detectors are constructed, in advance, by performing machine learning using a large number of face images photographed from the side or the front, and are stored in a storage unit (for example, an auxiliary storage device 1003 to be described later). The detector used for detection is, for example, a detector obtained by support vector machine (SVM), latent dirichlet allocation (LDA), and generalized learning vector quantization (GLVQ).

As described above, the passenger counting system according to the present exemplary embodiment can reduce the reflection on the glass window of the vehicle by performing the image separation using the independent component analysis, and thus, can accurately count the number of passengers of the vehicle.

Second Exemplary Embodiment

Figure 6:
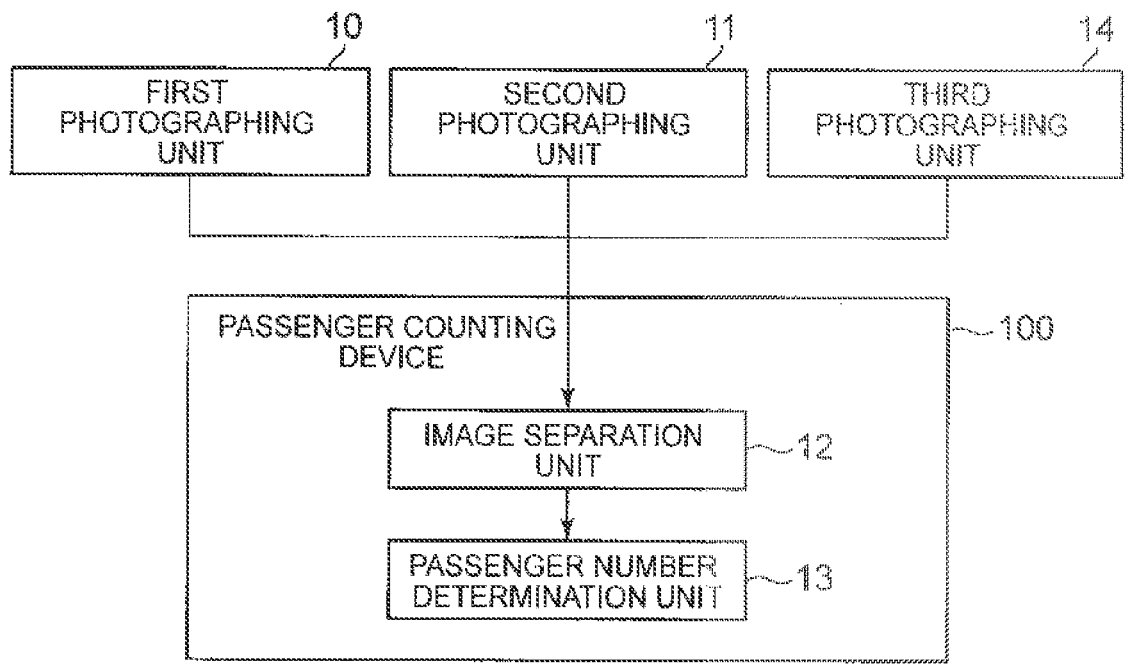
FIG. 6 It depicts a block diagram illustrating a configuration of a second exemplary embodiment of the passenger counting system according to the present invention.

A passenger counting system according to the present exemplary embodiment will be described with reference to the drawings. Incidentally, content of the following description mainly relates to configurations and functions different from those of the first exemplary embodiment (Exemplary Embodiment 1), and configurations and functions which are not particularly described are assumed to be the same as those of the first exemplary embodiment. FIG. 6 is a block diagram illustrating a configuration of the passenger counting system according to the present exemplary embodiment. The passenger counting system includes a first photographing unit 10, a second photographing unit 11, a third photographing unit 14, and a passenger number counting device 100. In addition, the passenger counting device 100 includes an image separation unit 12 and a passenger number determination unit 13. The passenger counting system according to the present exemplary embodiment is configured by adding the third photographing unit 14 to the passenger counting system according to the first exemplary embodiment.

The third photographing unit 14 photographs a vehicle in a state of receiving only a second specific wavelength band different from a first specific wavelength band and acquires a third image. The third photographing unit 14 is a general camera similar to the first photographing unit 10 and the second photographing unit 11, and photographs the vehicle as a subject to generate a digital image. The third photographing unit 14 has sensitivity of light of at least the second specific wavelength band.

Figure 7:
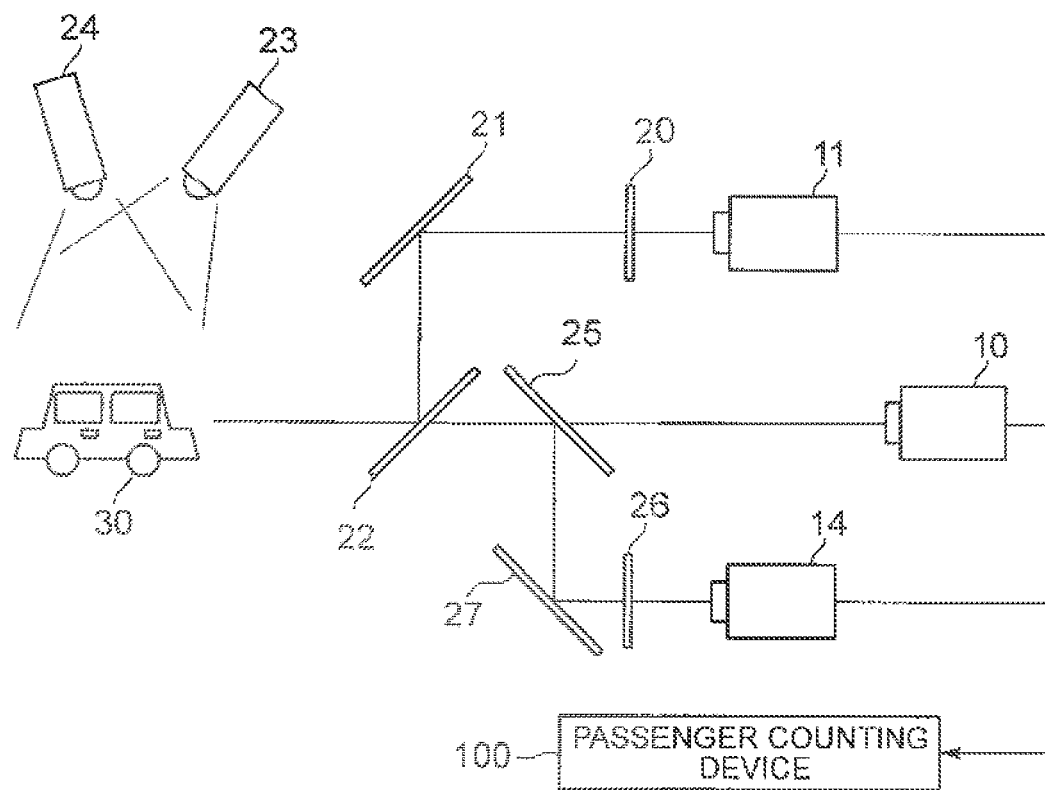
FIG. 7 It depicts a block diagram illustrating a hardware configuration of the second exemplary embodiment of the passenger counting system according to the present invention.

FIG. 7 is an explanatory diagram illustrating a hardware configuration of the passenger counting system according to the present exemplary embodiment. The third photographing unit 14 is installed at a position where the vehicle can be photographed. A band-pass filter 26 is installed in front of the third photographing unit 14. The band-pass filter 26 is a filter that can pass only light of a second specific wavelength band $\lambda_2$. A half mirror 25 is installed in front of the first photographing unit 10. A part of the light incident on the half mirror 25 from a direction of the vehicle is reflected and incident on a reflection mirror 27. The light incident on the reflection mirror 27 is reflected, passes through the band-pass filter 26, and is incident on the third photographing unit 14. In addition, a lamp 24 that emits the light of the second specific wavelength band $\lambda_2$ is installed at a position where the vehicle can be irradiated to irradiate the entire vehicle. The other configurations are the same as those of the first exemplary embodiment, and thus, the description thereof will be omitted.

In the configuration illustrated in FIG. 7, the respective devices are installed such that an optical path length from the first photographing unit 10 to the vehicle, an optical path length from the second photographing unit 11 to the vehicle, and an optical path length from the third photographing unit 14 to the vehicle are the same. In addition, the first photographing unit 10, the second photographing unit 11, and the third photographing unit 14 perform photographing such that a photographing range of the first photographing unit 10, a photographing range of the second photographing unit 11, and a photographing range of the third photographing unit 14 are the same.

With the above-described configuration, the third photographing unit 14 can photograph a vehicle image in the state where only the light of the second specific wavelength body $\lambda_2$ is incident. As the light passes through the band-pass filter 26, the light quantity decreases. However, the third photographing unit 14 can obtain a sufficient light quantity as the lamp 24 irradiates the vehicle with the light of the second specific wavelength band $\lambda_2$, and thus, it is possible to acquire the clear vehicle image.

Figure 8:
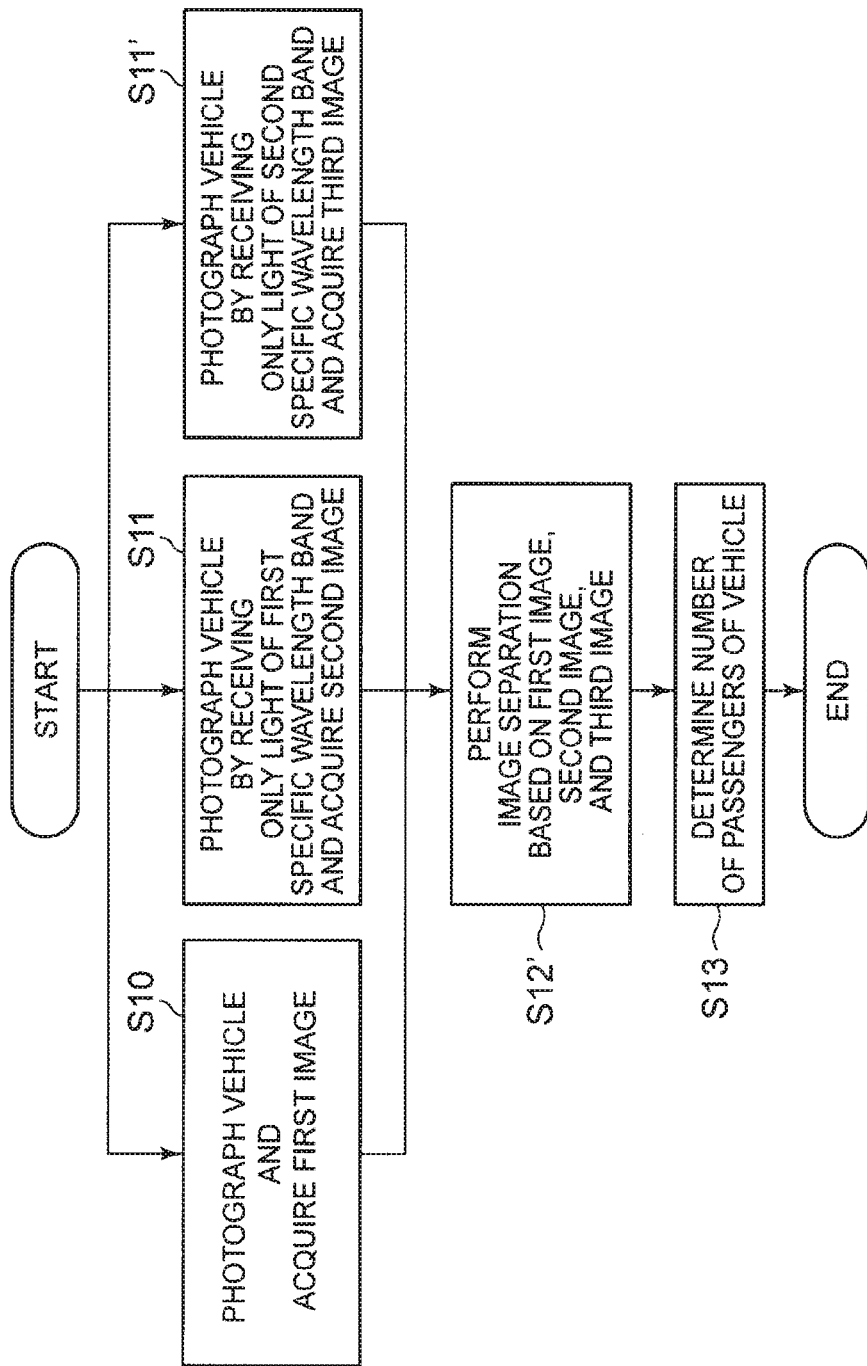
FIG. 8 It depicts a flowchart illustrating an operation of the second exemplary embodiment of the passenger counting system according to the present invention.

Next, an operation of the passenger counting system according to the present exemplary embodiment will be described. FIG. 8 is a flowchart illustrating the operation of the passenger counting system according to the present exemplary embodiment. Incidentally, the processes in steps S10, S11, and S13 illustrated in FIG. 8 are the same as those in the first exemplary embodiment, and thus, the description thereof will be omitted.

The third photographing unit 14 photographs the vehicle in the state of receiving only the light of the second specific wavelength band and acquires the image (step S11'). The installation position of the third photographing unit 14 may be any position as long as it is the position at which the vehicle can be photographed, which is similar to the installation positions of the first photographing unit 10 and the second photographing unit 11 that have been described in the first exemplary embodiment. The third photographing unit 14 is installed on the road side, for example, and photographs the vehicle from a lateral direction (direction perpendicular to a traveling direction of the vehicle). Since the band-pass filter 26 is installed in front of the third photographing unit 14, the third photographing unit 14 photographs the vehicle in the state where only the light of the second specific wavelength body $\lambda_2$ is incident. In addition, the third photographing unit 14 photographs the vehicle at the same timing as the first photographing unit 10 and the second photographing unit 11.

The image separation unit 12 performs the image separation based on a first image acquired by photographing the vehicle through the first photographing unit 10, a second image acquired by photographing the vehicle through the second photographing unit 11, and the third image acquired by photographing the vehicle through the third photographing unit 14, and acquires a plurality of separate images in which reflection on a glass window and depth of a vehicle body portion of the vehicle are reduced (step S12'). Specifically, the image separation unit 12 performs independent component analysis on image data representing the first image, the second image, and the third image, and separates an image representing the interior of the vehicle, an image representing the reflection on the glass window (a person, an object, or the like reflected on the glass window), and a part of the vehicle except for the glass window (hereinafter, referred to as the vehicle body portion).

The image separation using the independent component analysis will be described in details. Image data representing the first image is denoted by $x_1$, image data representing the second image is denoted by $x_2$, and image data representing the third image is denoted by $x_3$. In addition, an actual image representing the interior of the vehicle is denoted by $s_1$, an actual image representing the reflection on the glass window is denoted by $s_2$, and an actual image representing the vehicle body portion of the vehicle is denoted by $s_3$. Then, the acquired image is denoted by a vector $X=(x_1, x_2, x_3)^T$, and the actual image is denoted by a vector $S=(s_1, s_2, s_3)^T$. Since the image data $x_1$, $x_2$, and $x_3$ are obtained in the state of mixing of $s_1$, $s_2$, and $s_3$, the following Formula (1) is established when a mixing matrix is A, which is similar to the first exemplary embodiment.

The image separation unit 12 calculates a vector Y in Formula (2), similarly as in the first exemplary embodiment, but the present exemplary embodiment, it is expressed as the vector Y=(y1, y2, y3). The image separation unit 12 estimates y1, y2, and y3 by calculating a matrix W such that y1, y2, and y3 are independent.

One of $y_1$, $y_2$, and $y_3$ obtained as described above is an approximate value of $s_1$ representing the interior of the vehicle, another one is an approximate value of $s_2$ representing the reflection on the glass window, and the other one is an approximate value of $s_3$ representing the vehicle body portion of the vehicle. The image separation unit 12 outputs the image data which is the approximate value of $s_1$ representing the interior of the vehicle among $y_1$, $y_2$, and $y_3$ that represent the image data as a separate image in which the reflection and the depth of the vehicle body portion of the vehicle are reduced. For example, the image separation unit 12 analyzes the images of $y_1$, $y_2$, and $y_3$ and determines whether or not the image is an image inside the vehicle depending on presence or absence of a face of a person or in-vehicle equipment. Alternatively, the image separation unit 12 may output the images represented by $y_1$, $y_2$, and $y_3$ to an external display device to allow a user to select which image is the image inside the vehicle, and output the selected image as the separate image in which the reflection and the depth of the vehicle body portion of the vehicle are reduced.

Figure 9:
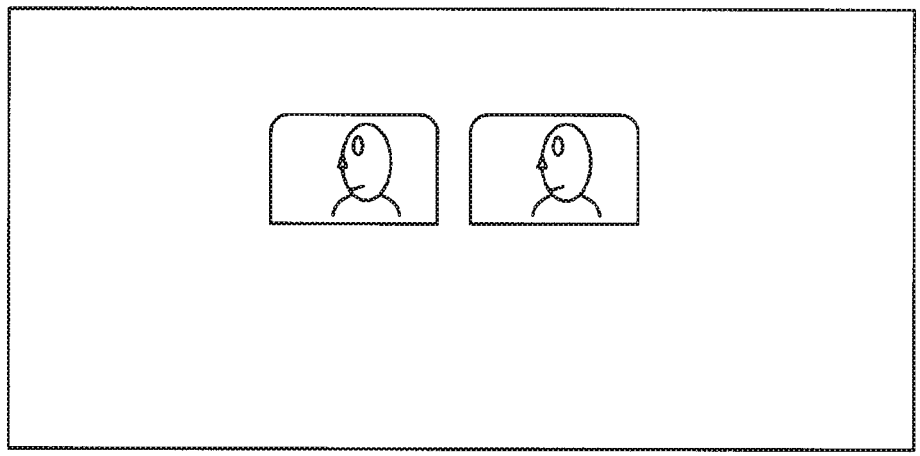
FIG. 9 It depicts an explanatory view illustrating a separate image according to the second exemplary embodiment.

FIG. 9 is an explanatory view illustrating the separate image according to the present exemplary embodiment. In the separate image illustrated in FIG. 9, the reflection on the glass window is reduced, and the face of the person inside the vehicle is clearly displayed. Further, the depth of the main body part of the vehicle is reduced. Although not illustrated, the reflection on the glass window and the main body part of the vehicle are displayed, respectively, on the other images obtained by separation.

When the image of the vehicle includes the vehicle body portion, it is preferable that the user perform image processing to eliminate the vehicle body portion of the vehicle in advance before performing face detection. However, the vehicle body portion of the vehicle has already been removed from the separate image according to the present exemplary embodiment as illustrated in FIG. 9. Thus, the passenger number determination unit 13 can accurately determine the number of passengers in a process of performing the face detection and determining the number of passengers of the vehicle.

As described above, the passenger counting system according to the present exemplary embodiment can reduce not only the reflection on the glass window of the vehicle but also the depth of the vehicle body portion of the vehicle by performing the image separation using the independent component analysis. Thus, it is possible to accurately count the number of passengers of the vehicle even if the user does not perform the image processing to remove the vehicle body portion of the vehicle according to the passenger counting system of the present exemplary embodiment.

Third Exemplary Embodiment

A passenger counting system according to the present exemplary embodiment will be described with reference to the drawings. In the present exemplary embodiment, only a function of the passenger number determination unit 13 is different from that of the first exemplary embodiment, and the other configurations are the same, and thus, the description of the configuration will be omitted. It is assumed that the configurations and functions that are not specifically described are the same as those in the first exemplary embodiment.

Figure 10:
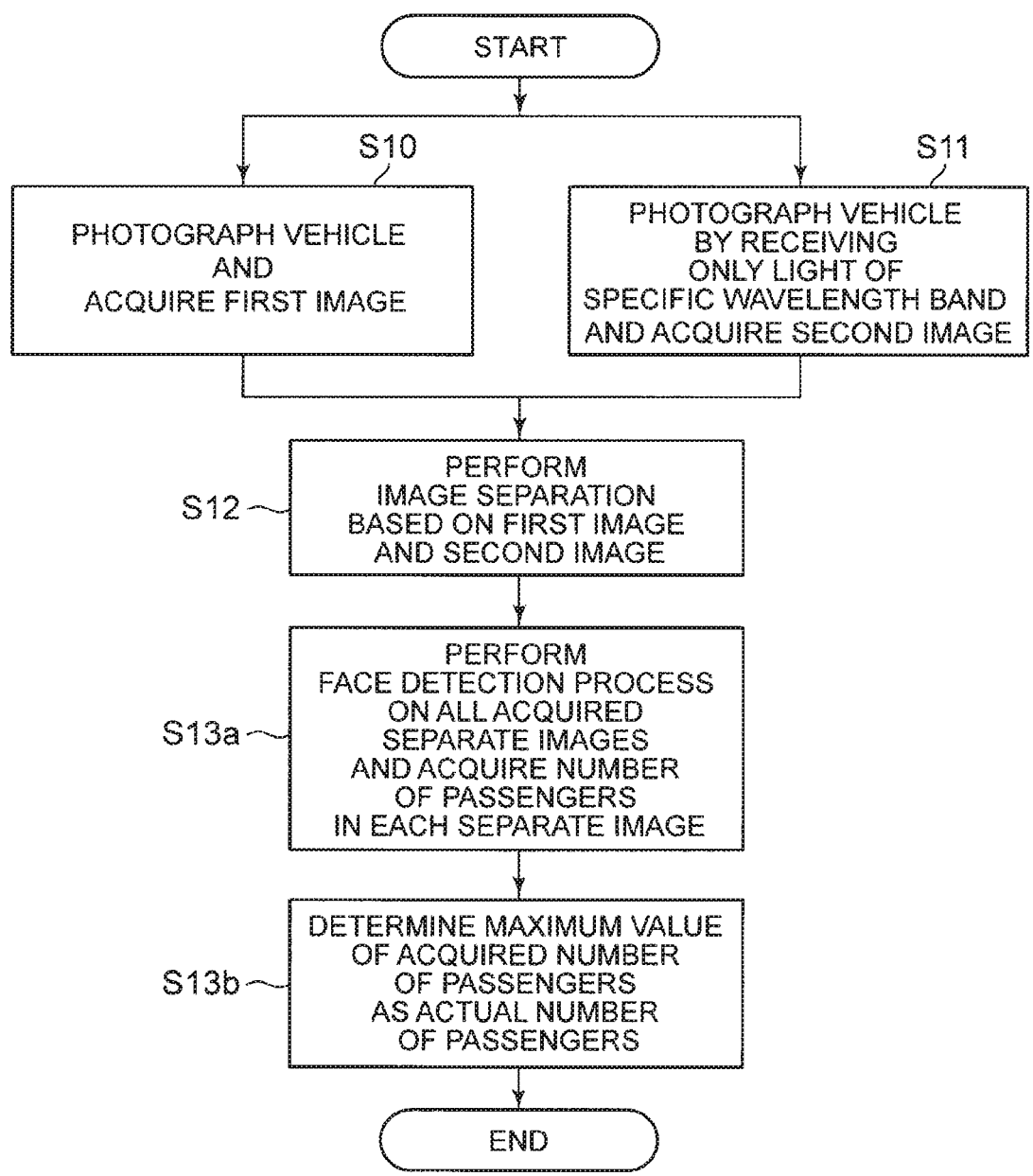
FIG. 10 It depicts a flowchart illustrating an operation of a third exemplary embodiment of the passenger counting system according to the present invention.

FIG. 10 is a flowchart illustrating an operation of the passenger counting system according to a third exemplary embodiment. In FIG. 10, steps S10 to S12 are the same as the processes of the first exemplary embodiment (see FIG. 3), and thus, the description thereof will be omitted.

Although the passenger number determination unit 13 acquires the plurality of separate images output by the image separation unit 12, there is a case where it is difficult to determine any separate image that is the separate image in which the reflection is reduced. Thus, the passenger number determination unit 13 performs a face detection process on all the acquired separate images, and acquires the number of passengers in each separate image (step S13a).

Then, the passenger number determination unit 13 determines a maximum value among the number of passengers of each separate image as the actual number of passengers (step S13b).

Although the image separation unit 12 determines any separate image that is the separate image in which the reflection is reduced or performs the process of causing the user to select the separate image in the first exemplary embodiment, these processes may be omitted in the present exemplary embodiment.

Although the example in which the passenger number determination unit 13 of the passenger counting system according to the first exemplary embodiment is changed is illustrated in the present exemplary embodiment, the passenger number determination unit 13 according to the present exemplary embodiment may be applied to the configuration of the passenger counting system according to the second exemplary embodiment.

According to the passenger counting system of the present exemplary embodiment, it is possible to accurately determine the number of passengers even when it is difficult to determine any separate image that is the separate image in which the reflection is reduced.

Figure 11:
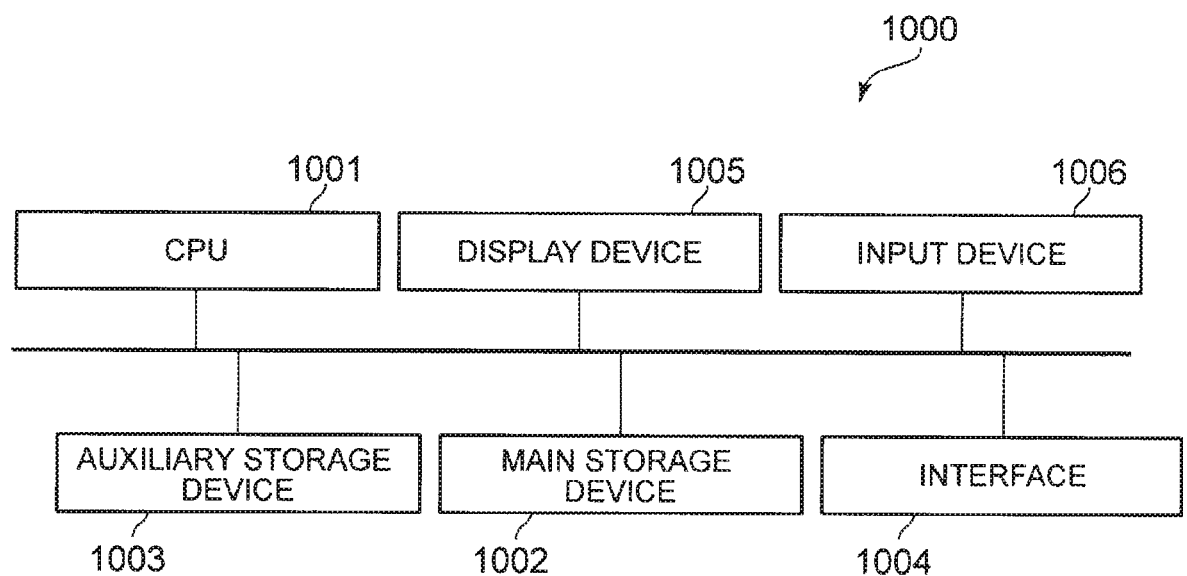
FIG. 11 It depicts a schematic block diagram illustrating a configuration example of a computer to which a passenger counting device according to the present invention is mounted.

FIG. 11 is a schematic block diagram illustrating a configuration example of a computer according to the present exemplary embodiment. A computer 1000 includes a CPU 1001, a main storage device 1002, an auxiliary storage device 1003, an interface 1004, a display device 1005, and an input device 1006.

The passenger counting device 100 according to the present exemplary embodiment is mounted to the computer 1000. The passenger number counting device 100 is stored in the auxiliary storage device 1003 in the form of a program. The CPU 1001 reads out the program from the auxiliary storage device 1003 and expands the program into the main storage device 1002 to execute the above-described processes according to the program.

The auxiliary storage device 1003 is a non-transitory tangible medium, and for example, is a magnetic disk, a magneto-optical disk, a CD-ROM, a DVD-ROM, a semiconductor memory, or the like. The computer 1000 may be connected to the auxiliary storage device 1003 via the interface 1004. When the program is distributed to the computer 1000 via a communication line, the computer 1000 may expand the program into the main storage device 1002 and execute the above-described processes in response to the distribution.

In addition, the program may be configured to implement some of the above-described processes. Further, the program may be a differential program which implements the above-described processes in combination with other programs that have been already stored in the auxiliary storage device 1003. In addition, a processor included in the computer 1000 is not limited to the CPU 1001, and it may be enough to provide a processor capable of executing a program. In addition, the computer 1000 includes a circuit.

Figure 12:
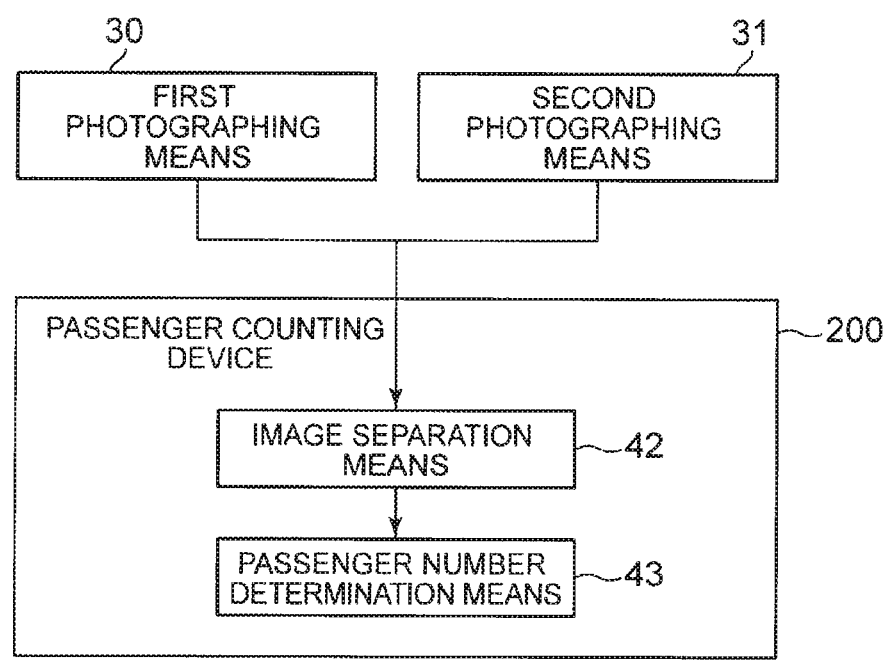
FIG. 12 It depicts a block diagram illustrating a configuration of a main part of the passenger counting system according to the present invention.

FIG. 12 is a block diagram illustrating a main part of the passenger counting system according to the present invention. The passenger counting system according to the present invention includes: a first photographing means 30 for photographing a vehicle and acquiring a first image; a second photographing means 31 for photographing the vehicle in a state of receiving only light of a first specific wavelength band and acquiring a second image; and a passenger counting device 200. The passenger counting device 200 includes: an image separation means 42 for acquiring a plurality of separate images based on the first image and the second image; and a passenger number determination means 43 for determining the number of passengers of the vehicle based on the plurality of separate images.

In addition, the passenger counting system illustrated in the following (1) to (7) is also disclosed in the above-described exemplary embodiments.

(1) The passenger counting system may be configured such that the passenger counting means (for example, the passenger number determination unit 13) acquires the number of passengers for each of the plurality of separate images and determines the maximum value of the acquired number of passengers as the number of passengers of the vehicle.

(2) The passenger counting system may be configured such that the image separation means (for example, the image separation unit 12) performs image separation using the independent component analysis. According to such a passenger counting system, it is possible to execute the image separation only from the first image and the second image.

(3) The passenger counting system may be configured such that the image separation means (for example, the image separation unit 12) separates image data into two images having different distances from the first photographing means (for example, the first photographing unit 10) and the second photographing means (for example, the second photographing unit 11) based on the first image and the second image.

(4) The passenger counting system may be configured to include the irradiation means (for example, the lamp 23) for irradiating the vehicle with the light of the first specific wavelength band. According to such a passenger counting system, it is possible to compensate for the decrease in the light quantity even in the state of receiving only the light of the first specific wavelength band.

(5) The passenger counting system may be configured such that the optical path length from the first photographing means to the vehicle and the optical path length from the second photographing means to the vehicle are the same.

(6) The passenger counting system may be configured such that the photographing range of the first photographing means and the photographing range of the second photographing means are the same.

(7) A passenger counting system including: the first photographing means (for example, the first photographing unit 10) for photographing the vehicle and acquiring the first image; the second photographing means (for example, the second photographing unit 11) for photographing the vehicle in the state of receiving only the light of the first specific wavelength band and acquiring the second image; the third photographing means (for example, the third photographing unit 14) for photographing the vehicle in the state of receiving only the light of the second specific wavelength band different from the first specific wavelength band and acquiring the third image; the image separation means (for example, the image separation unit 12) for acquiring a plurality of separate images based on the first image, the second image, and the third image; and the passenger number determination means (for example, the passenger number determination unit 13) for determining the number of passengers of the vehicle based on the plurality of separate images. According to such a passenger counting system, it is possible to reduce not only the reflection on the glass window but also the depth of the vehicle body portion of the vehicle, and thus, it is possible to save the labor for the user to remove the reflection and the depth.

As above, the invention of the present application has been described with reference to the exemplary embodiments, but the invention of the present application is not limited to the above-described exemplary embodiments. Various modifications that can be understood by the person skilled in the art can be made within a scope of the invention of the present application regarding the configuration and the details of the invention of the present application. In addition, the invention of the present application may be obtained by combining the configurations of the respective exemplary embodiments as appropriate.

REFERENCE SIGNS LIST

10 First photographing unit
11 Second photographing unit
12 Image separation unit
13 Passenger number determination unit
14 Third photographing unit
30 First photographing means
31 Second photographing means
42 Image separation means
43 Passenger number determination means
100, 200 Passenger counting device

The invention claimed is:

1. An image processing system comprising:
at least one memory storing instructions; and
at least one processor coupled to the at least one memory and configured to execute the instructions to:
acquire a first image by causing a first photographing device to photograph a vehicle illuminated by a first light source and a second light source, wherein the second source illuminates the vehicle from a direction different from that of the first light source
acquire a second image by causing a second photographing device to photograph the second image within the same range as that of the first photographing device through a first filter;
acquire a third image by causing a third photographing device to photograph the third image within the same range as that of the first photographing device through a second filter whose type is different from that of the first filter; and
generate a fourth image by performing processing on the first image, the second image and the third image, the fourth image being an image in which:
intensity of a figure of a passenger of the vehicle is raised as compared to the first image;
intensity of a figure of the vehicle is reduced as compared to the first image; and
intensity of a figure of an external object which is reflected by the vehicle and imaged in the first image is reduced as compared to the first image.

2. The image processing system according to claim 1, further comprising:
the first light source which emits light that is capable of passing through the first filter; and
the second light source which emits light that is capable of passing through the second filter.

3. The image processing system according to claim 1, wherein the at least one processor is further configured to
generate the fourth image, a fifth image and sixth image by the processing using independent component analysis, the fifth image being an image in which intensity of a figure of the vehicle is raised as compared to the first image, the sixth image being an image in which intensity of a figure of the external object is raised as compared to the first image.

4. The image processing system according to claim 1, wherein the at least one processor is further configured to:
determine whether a person is present in the fourth image; and
determine a number of persons in the vehicle based on the fourth image.

5. The image processing system according to claim 4, wherein the at least one processor is configured to determine whether a person is present in the fourth image by performing detection of a specific part of a person, the specific part being selected from: a nose; an eye; an arm; and a neck.

6. The image processing system according to claim 1, wherein the at least one processor is further configured to:
perform face detection on the fourth image, the face detection using a face detector which is constructed in advance by performing machine learning using a plurality of face images including at least any of frontal face images and face images photographed from a side; and
determine a number of persons in the vehicle based on a result of the face detection.

7. An image processing method comprising:
acquiring a first image by causing a first photographing device to photograph a vehicle illuminated by a first light source and a second light source, wherein the second source illuminates the vehicle from a direction different from that of the first light source acquiring a second image by causing a second photographing device to photograph the second image within the same range as that of the first photographing device through a first filter;
acquiring a third image by causing a third photographing device to photograph the third image within the same range as that of the first photographing device through a second filter whose type is different from that of the first filter; and
generating a fourth image by performing processing on the first image, the second image and the third image, the fourth image being an image in which:
intensity of a figure of a passenger of the vehicle is raised as compared to the first image;
intensity of a figure of the vehicle is reduced as compared to the first image; and
intensity of a figure of an external object which is reflected by the vehicle and imaged in the first image is reduced as compared to the first image.

8. The image processing method according to claim 7, wherein
the first light source emits light that is capable of passing through the first filter, and
the second light source emits light that is capable of passing through the second filter.

9. The image processing method according to claim 7, further comprising
generating the fourth image, a fifth image and sixth image by the processing using independent component analysis, the fifth image being an image in which intensity of a figure of the vehicle is raised as compared to the first image, the sixth image being an image in which intensity of a figure of the external object is raised as compared to the first image.

10. The image processing method according to claim 7, further comprising:
determining whether a person is present in the fourth image; and
determining a number of persons in the vehicle based on the fourth image.

11. The image processing method according to claim 10, comprising
determining whether a person is present in the fourth image by performing detection of a specific part of a person, the specific part being selected from: a nose; an eye; an arm; and a neck.

12. The image processing method according to claim 7, further comprising:
performing face detection on the fourth image, the face detection using a face detector which is constructed in advance by performing machine learning using a plurality of face images including at least any of frontal face images and face images photographed from a side; and
determining a number of persons in the vehicle based on a result of the face detection.

13. A non-transitory computer-readable storage medium storing a program that causes a computer to perform:
acquiring a first image by causing a first photographing device to photograph a vehicle illuminated by a first light source and a second light source, wherein the second source illuminates the vehicle from a direction different from that of the first light source
acquiring a second image by causing a second photographing device to photograph the second image within the same range as that of the first photographing device through a first filter;
acquiring a third image by causing a third photographing device to photograph the third image within the same range as that of the first photographing device through a second filter whose type is different from that of the first filter; and
generating a fourth image by performing processing on the first image, the second image and the third image, the fourth image being an image in which:
intensity of a figure of a passenger of the vehicle is raised as compared to the first image;
intensity of a figure of the vehicle is reduced as compared to the first image; and
intensity of a figure of an external object which is reflected by the vehicle and imaged in the first image is reduced as compared to the first image.

14. The non-transitory computer-readable storage medium according to claim 13, wherein
the first light source emits light that is capable of passing through the first filter, and
the second light source emits light that is capable of passing through the second filter.

15. The non-transitory computer-readable storage medium according to claim 13, wherein the program causes the computer to perform:
generating the fourth image, a fifth image and sixth image by the processing using independent component analysis, the fifth image being an image in which intensity of a figure of the vehicle is raised as compared to the first image, the sixth image being an image in which intensity of a figure of the external object is raised as compared to the first image.

16. The non-transitory computer-readable storage medium according to claim 13, wherein the program further causes the computer to perform:
- determining whether a person is present in the fourth image; and
- determining a number of persons in the vehicle based on the fourth image.

17. The non-transitory computer-readable storage medium according to claim 16, wherein the program causes the computer to perform:
- determining whether a person is present in the fourth image by performing detection of a specific part of a person, the specific part being selected from: a nose; an eye; an arm; and a neck.

18. The non-transitory computer-readable storage medium according to claim 13, wherein the program further causes the computer to perform:
- face detection on the fourth image, the face detection using a face detector which is constructed in advance by performing machine learning using a plurality of face images including at least any of frontal face images and face images photographed from a side; and
- determining a number of persons in the vehicle based on a result of the face detection.

* * * * *